United States Patent [19]

Mc Kee et al.

[11] Patent Number: 5,977,254
[45] Date of Patent: *Nov. 2, 1999

[54] MOLDING MATERIAL

[75] Inventors: Graham Edmund Mc Kee, Neustadt; Norbert Niessner, Friedelsheim; Herbert Fisch, Wachenheim, all of Germany

[73] Assignee: BASF Aktiengesellschaft, Ludwigshafen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/833,462

[22] Filed: Apr. 7, 1997

Related U.S. Application Data

[63] Continuation of application No. 08/396,706, Mar. 1, 1995, abandoned.

[30] Foreign Application Priority Data

Mar. 3, 1994 [JP] Japan ..................................... 4407069

[51] Int. Cl.$^6$ ............................. C08L 51/04; C08L 61/02
[52] U.S. Cl. ................................. 525/64; 525/63; 525/66; 525/67; 525/68; 525/84; 525/85; 525/401
[58] Field of Search .................................. 525/63, 64, 66, 525/84, 85, 67, 401

[56] References Cited

U.S. PATENT DOCUMENTS

| | | | |
|---|---|---|---|
| 3,749,755 | 7/1973 | Bronstert | 525/64 |
| 3,966,842 | 6/1976 | Ludwig et al. | 260/873 |
| 4,096,202 | 6/1978 | Farnham | 525/64 |
| 4,654,400 | 3/1987 | Lohmeijer | 525/64 |
| 4,666,973 | 5/1987 | Heinz | 525/64 |
| 4,962,148 | 10/1990 | Orikasa | 525/66 |
| 5,036,120 | 7/1991 | Orikasa | 525/64 |
| 5,039,741 | 8/1991 | Burg | 525/64 |
| 5,120,788 | 6/1992 | Seitz | 525/85 |
| 5,223,586 | 6/1993 | Mautner | 525/477 |
| 5,252,666 | 10/1993 | Seitz | 525/80 |
| 5,342,898 | 8/1994 | Seitz et al. | 525/281 |

FOREIGN PATENT DOCUMENTS

| | | |
|---|---|---|
| 2048765 | 2/1992 | Canada ..................................... 523/201 |
| 391343 | 10/1990 | European Pat. Off. . |
| 449450 | 10/1991 | European Pat. Off. . |
| 450511 | 10/1991 | European Pat. Off. . |
| 584363 | 3/1994 | European Pat. Off. . |
| 3530304 | 8/1985 | Germany . |
| 54-103493 | 1/1978 | Japan . |
| 54-103497 | 2/1978 | Japan . |
| 54-56410 | 5/1979 | Japan . |

OTHER PUBLICATIONS

Gan et al., *Polymer Bulletin*, vol. 25, 1991, pp. 193–198.
Antonietti et al., *Macromolecules*, vo. 24, 1991, pp. 6636–6643.

*Primary Examiner*—Patricia A. Short
*Attorney, Agent, or Firm*—Keil & Weinkauf

[57] ABSTRACT

A molding material contains, based on the sum of the components A and B, and, if required, C, D and/or E, A: 1–99% by weight of a particulate microemulsion polymer having a glass transition temperature below 0° C. and a median particle size of less than 50 nm, B: 1–99% by weight of a semicrystalline polymer B, in particular selected from at least one polymer from semicrystalline polyamides, partly aromatic copolyamides, polyolefins, ionomers, polyesters, polyetherketones, polyoxyalkylenes and polyarylene sulfides, C: 0–50% by weight of a polymer selected from a particulate graft copolymer having a median particle size of from 60 to 10,000 nm, a thermoplastic polyurethane, a thermoplastic elastomer and an acrylate, diene, EP, EPDM or silicone rubber, D: 0–50% by weight of polycarbonates and E: 0–50% by weight of fibrous or particulate fillers or of a mixture thereof.

5 Claims, No Drawings

MOLDING MATERIAL

This application is a continuation of application Ser. No. 08/396,706, filed on Mar. 1, 1995, now abandoned.

The present invention relates to a toughened molding material.

It is known that water-insoluble oils can be dispersed with a combination of suitable emulsifiers so finely as to give optically transparent, isotropic emulsions which are then referred to as microemulsions (EP 449 450). Similar systems are also known as miniemulsions (D.O. Shah, Ed. Macro- and Microemulsion: Theory and Practices, American Chemical Society, Washington D.C., 1985; ACS Symp. Series, 272). In contrast to the usual emulsions (macroemulsions), very small particle sizes of the oil phases in water are obtained in miniemulsions and microemulsions.

In contrast to macroemulsions, microemulsions should not contain any actual oil droplets, but the oil should be present completely in the emulsifier micelles, which may be very small (from about 10 to 100 nm in diameter, depending on the amount of emulsifier, also see: L. M. Gan, C. H. Chew, I. Lye and T. Imae; Polymer Bulletin 25 (1991), 193). Another view is that there is to date still no generally recognized definition of the expression microemulsion (M. Antonietti et al.; Macromolecules 24 (1991), 6636). In general, however, it is accepted that a microemulsion differs from a conventional emulsion in its optical translucence or transparency, in its very small particles and in its thermodynamic stability.

Microemulsions of polymers are also known. Thus, EP 391 343 describes finely divided microemulsions of polyacrylates having a glass transition temperature below 20° C. and having a particle size below 600 Å, ie. 60 nm. They are used, inter alia, as paper coating emulsions.

JP-A-54 103 497 describes the emulsion polymerization of acrylate in the presence of large amounts of anionic emulsifiers for obtaining small particle sizes. The viscosity of the emulsion is controlled by adding ionic electrolytes (salts). Emulsion particles having a diameter of from 5 to 50 nm are obtained.

JP-A-54 103 493 describes the preparation of an acrylate monomer emulsion containing large amounts of emulsifier and subsequent polymerization. The viscosity of the emulsion is controlled by adding ionic electrolytes (salts). Particle sizes of from 5 to 50 nm are obtained.

JP-A-54 056 410 describes the preparation of acrylate microemulsions having a bimodal particle size distribution by shearing of emulsions having particle sizes greater than 0.1 μm.

EP-A-450 511 describes graft polymers having median particle sizes of from 30 to 1,000 nm, which however contain acid functions in the core and basic monomer units in the graft shell. When mixed with thermoplastics, however, these polymers show a strong tendency to agglomeration and are therefore unsuitable for the preparation of molding materials having high transparency.

It is an object of the present invention to provide novel molding materials. These should in particular be tough and have advantageous mechanical and, where relevant, optical properties, such as high rigidity and good gloss. Good colorability is also desirable.

We have found that this object is achieved by the products as defined in the claims together with the preferred embodiments.

We have found that mixing microemulsions of, preferably, rubber polymers (microemulsion polymer) with thermoplastics gives toughened thermoplastics which, in addition to good impact strength, have high rigidity and, where relevant, transparency in combination with excellent gloss. A further advantage of these molding materials is their good colorability.

The median particle size of the microemulsion polymer is advantageously less than 50 nm, in particular less than 40 nm, particularly advantageously less than 30 nm, and the glass transition temperature is correspondingly below 0° C., below −20° C. and below −30° C., respectively.

In a preferred embodiment, the novel molding material contains further components C and/or D and/or E, as defined below.

One embodiment of the present invention is thus a molding material containing, based on the sum of the components A and B and, if required, C, D and/or E, A: 1–99% by weight of a particulate microemulsion polymer having a glass transition temperature below 0° C. and a median particle size of less than 50 nm, B: 1–99% by weight of at least one semicrystalline polymer B, C: 0–50% by weight of a polymer selected from a particulate graft copolymer having a median particle size of from 60 to 10,000 nm, a thermoplastic polyurethane, a thermoplastic elastomer and an acrylate, diene, EP, EPDM or silicone rubber, D: 0–50% by weight of polycarbonates and E: 0–50% by weight of fibrous or particulate fillers or of a mixture thereof.

The semicrystalline polymer B is preferably selected from polyamides, partly aromatic copolyamides, polyolefins, ionomers, polyesters, polyetherketones, polyoxyalkylenes and polyarylene sulfides.

In a particularly preferred embodiment of the invention, the component A is a graft copolymer comprising A1: 1–99% by weight of a particulate grafting base A1 having a glass transition temperature below 0° C. and a median particle size of less than 40 nm, A2: 1–99% by weight of a graft A2 comprising the monomers, based on A2, A21: 40–100% by weight of units of styrene, of a substituted styrene or of a (meth)acrylate or of a mixture thereof and A22: up to 60% by weight of acrylonitrile or methacrylonitrile, where the graft A2 consists of at least one graft shell, and the outermost graft shell thereof has a glass transition temperature of more than 0° C., a polymer formed from the monomers of the graft A2 would have a glass transition temperature of more than 0° C. and the graft copolymer A has a median particle size of less than 50 nm.

In spite of the high emulsifier content of the grafting base, the monomers (graft) used for producing the graft shell graft essentially completely onto the grafting base, and no new particles (consisting of polymers of the graft) are formed.

The median particle size of the grafting base is advantageously less than 40 nm, in particular less than 30 nm, particularly advantageously less than 25 nm, and the median particle size of the total graft polymer, consisting of grafting base and shell grafted thereon, is correspondingly less than 50 nm, less than 40 nm and less than 30 nm, respectively.

The novel molding material preferably contains 5–70% by weight of component A and 30–95% by weight of component B, particularly preferably 10–50% by weight of component A and 50–90% by weight of component B, based in each case on the total molding material.

The invention is illustrated in detail below.

The particulate microemulsion polymer A of the novel molding material is a polymer having at least one glass transition temperature below 0° C., preferably below −20° C., particularly preferably below −30° C. This glass transition temperature is determined by DSC (differential scanning calorimetry) according to ASTM 3418 (mid-point temperature).

The sizes determined from the integral mass distribution are stated as the median particle size or particle size distribution. In all cases, the median particle sizes are the weight average of the particle sizes, as determined by means of an analytical ultracentrifuge by the method of W. Scholtan and H. Lange, Kolloid-Z und Z.-Polymere 250 (1972), 782–796. The ultracentrifuge measurement gives the integral mass distribution of the particle diameter of a sample. From this it is possible to determine the percentage by weight of the particles which have a diameter equal to or smaller than a certain size. The median particle diameter, which is also referred to as the $d_{50}$ value of the integral mass distribution, is defined as the particle diameter at which 50% by weight of the particles have a smaller diameter than the diameter which corresponds to the $d_{50}$ value. Likewise, 50% by weight of the particles then have a diameter larger than the $d_{50}$ value. In order to characterize the width of the size distribution of the particles, the $d_{10}$ and $d_{90}$ values obtained from the integral mass distribution are used in addition to the $d_{50}$ value (median particle diameter). The $d_{10}$ or $d_{90}$ value of the integral mass distribution is defined similarly to the $d_{50}$ value, except that it is based on 10 and 90% by weight of the particles, respectively. The quotient $$\frac{d_{90} - d_{10}}{d_{50}} = Q$$

is a measure of the distribution width of the particle size. Microemulsion polymers A suitable for the novel molding materials have Q values of from 0.05 to 1.0, in particular from 0.5 to 0.8.

Since the microemulsion polymers A scatter light only to a slight extent owing to their small particle size in emulsion, these emulsions appear to the observer to be in some cases opaque to translucent and, in the limiting case, transparent. In the case of high translucence or transparency (virtually no scattering of light by graft copolymer particles), the method described above for determining the particle size by means of an ultracentrifuge is difficult. Here, another possible method for determining the median particle size d(50) is dynamic light scattering or quasi-elastic light scattering. This method is described, for example, in B. J. Berne and R. Pecora, Dynamic Light Scattering, John Wiley & Sons, Inc., New York 1976, and in: B. B. Weiner, Modern Methods of Particle Size Analysis, Chapter 3 (Ed. H. G. Barth), John Wiley & Sons, Inc., New York 1984.

Here, the diffusion coefficient of colloidal particles in solution or emulsion is determined and is then correlated theoretically with the hydrodynamic diameter of the particles, a measure of the particle size, by means of the Stokes-Einstein equation. If the particles have a particle size distribution as mentioned in the description of the measurement by means of an ultracentrifuge, an average particle diameter is obtained.

The relevant conventional rubbers may be used as microemulsion polymer A. For example, natural rubber, epichlorohydrin rubbers, ethylene/vinyl acetate rubbers, chlorosulfonated polyethylene rubbers, silicone rubbers, polyether rubbers, diene rubbers, hydrogenated diene rubbers, polyalkenamer rubbers, acrylate rubbers, ethylene/propylene rubbers, ethylene/propylene/diene rubbers, butyl rubbers and fluorine rubbers may be used. Acrylate rubber, ethylene/propylene (EP) rubber, ethylene/propylene/diene (EPDM) rubber, in particular butadiene/isoprene rubber; hydrogenated diene rubber or silicone rubber, is preferably used.

The acrylate rubbers are preferably alkyl acrylate rubbers comprising one or more $C_4$–$C_8$-alkyl acrylates, preferably butyl, hexyl, octyl or 2-ethylhexyl acrylate having been at least partly used. These alkyl acrylate rubbers may contain, as polymerized units, up to 30% by weight of monomers which form hard polymers, such as vinyl acetate, (meth) acrylonitrile, styrene, substituted styrene, methyl methacrylate or vinyl ether. The acrylate rubbers furthermore contain up to 10, preferably from 1 to 5, % by weight of crosslinking, polyfunctional monomers (crosslinking monomers). Examples of these are monomers which contain two or more double bonds capable of copolymerization.

Suitable crosslinking monomers are, for example, divinylbenzene, diallyl maleate, diallyl fumarate, diallyl phthalate, triallyl cyanurate, triallyl isocyanurate, triallyl phosphate and allyl methacrylate. Dicyclopentadienyl acrylate has proven to be a particularly advantageous crosslinking monomer (cf. German Patent 1,260,135).

Diene rubbers are, for example, homopolymers of conjugated dienes of 4 to 8 carbon atoms, such as butadiene, isoprene, piperylene and chloroprene, copolymers of such dienes with one another and copolymers of such dienes with styrene, acryloyl or methacryloyl compounds (eg. acrylonitrile, methacrylonitrile, acrylic acid, methacrylic acid, butyl acrylate, ethylhexyl acrylate and methyl methacrylate). Particular preferred diene rubbers are butadiene, butadiene/styrene, butadiene/methyl methacrylate, butadiene/butyl acrylate and butadiene/acrylonitrile rubbers.

Suitable silicone rubbers may be, for example, crosslinked silicone rubbers comprising units of the general formulae $R_2SiO$, $RSiO_{3/2}$, $R_3SiO_{1/2}$ and $SiO_{2/4}$, where R is a monovalent radical. The amount of the individual siloxane units is such that there are from 0 to 10 molar units of the formula $RSiO_{3/2}$, from 0 to 1.5 molar units of $R_3SiO_{1/2}$ and from 0 to 3 molar units of $SiO_{2/4}$ per 100 units of the formula $R_2SiO$. R may be either a monovalent saturated hydrocarbon radical of 1 to 18 carbon atoms, phenyl or alkoxy or a group which can be readily attacked by free radicals, such as vinyl or mercaptopropyl. Preferably, at least 80% of all radicals R are methyl; combinations of methyl and ethyl or phenyl are particularly preferred.

Preferred silicone rubbers contain incorporated units of groups which can be attacked by free radicals, in particular vinyl, allyl, halogen and mercapto, preferably in amounts of from 2 to 10 mol % based on all radicals R. They may be prepared, for example, as described in EP-A 260 558.

The microemulsion polymer A may also be a polymer composed of a plurality of stages (ie. core-shell morphology). For example, an elastomeric core ($T_g$<0° C.) may be surrounded by a hard shell (polymers having $T_g$>0° C.), or vice versa.

Rubbers which already consist of pre-formed core/shell rubber particles can therefore also be used as microemulsion polymer A. For example, the core may consist of a polybutadiene rubber or of a silicone rubber, but also of a styrene or methyl methacrylate homopolymer or copolymer, for example polystyrene/acrylonitrile. The shell may then consist of, for example, a polyacrylate (EP 260 558). One or more graft shells may be applied to the rubber particles by a single grafting step or multiple stepwise grafting, and each graft shell may have a different composition. In addition to the grafting monomers, polyfunctional monomers containing crosslinking or reactive groups may also be grafted on (cf. for example EP-A 230 282, German Laid-Open Application DOS 3,601,419 and EP-A 269 861).

In some cases, it may be advantageous to use a microemulsion polymer A comprising uncrosslinked polymer. All of the abovementioned monomers may be used as monomers for the preparation of these polymers. Preferred uncrosslinked microemulsion polymers A are, for example, homopolymers and copolymers of acrylates, in particular of n-butyl acrylate and of ethylhexyl acrylate, homopolymers and copolymers of butadiene or of isoprene and homopolymers and copolymers of ethylene, propylene, butylene and isobutylene, as well as poly(organosiloxanes), all with the proviso that they may be linear or branched.

In a particularly preferred embodiment of the invention, the component A is a graft copolymer. The graft copolymers A of the novel molding materials have a median particle size $d_{50}$ of less than 50 nm, preferably less than 40 nm, particularly preferably less than 30 nm. These particle sizes can be obtained if particle sizes of less than 40 nm, preferably less than 30 nm, particularly preferably less than 25 nm, are used as grafting base A1 of this component A.

The graft copolymer A is in general a single-stage or multistage copolymer, ie. a polymer composed of a core and one or more shells. The polymer consists of a basic stage (core) A1 and one or, preferably, more stages A2 grafted thereon (graft), ie. graft stages or graft shells.

In a preferred embodiment, component A consists of a multistage graft copolymer, the graft stages generally being prepared from resin-forming monomers and having a glass transition temperature $T_g$ above 30° C. The multistage morphology serves, inter alia, to achieve a (partial) compatibility of the rubber particles A with the thermoplastic B.

Graft copolymers A are prepared, for example, by grafting at least one of the monomers A2 stated below onto at least one of the grafting bases or core materials A1 stated below.

Suitable monomers for the formation of the graft A2 may be chosen, for example, from the monomers stated below:

styrene and its substituted derivatives, eg. α-methylstyrene, p-methylstyrene, 3,4-dimethylstyrene, p-tert-butylstyrene, o- and p-divinylbenzene and p-methyl-α-methylstyrene, or $C_1$–$C_8$-alkyl (meth)acrylates, such as methyl methacrylate, ethyl methacrylate, methyl acrylate, ethyl acrylate, n-butyl acrylate and sec-butyl acrylate; styrene, α-methylstyrene, methyl methacrylate and acryloyl and methacryloyl compounds, eg. acrylonitrile, methacrylonitrile, acrylic and methacrylic acid, methyl acrylate, ethyl acrylate, n-propyl acrylate, isopropyl acrylate, n-butyl acrylate, isobutyl acrylate, tert-butyl acrylate, 2-ethylhexyl acrylate, methyl methacrylate, ethyl methacrylate, n-propyl methacrylate, isopropyl methacrylate, n-butyl methacrylate, isobutyl methacrylate, tert-butyl methacrylate, cyclohexyl methacrylate, isobornyl methacrylate, maleic anhydride and its derivatives, such as esters and diesters of maleic acid and maleimides, for example alkyl- and arylmaleimides, such as methyl- or phenylmaleimide, are preferred.

In a preferred embodiment, the graft A2 consists of at least one graft shell, and the outermost graft shell thereof has a glass transition temperature of more than 0° C., and a polymer formed from the monomers of the graft A2 would have a glass transition temperature of more than 0° C.

Suitable grafting bases A1 of the novel molding materials are all the polymers which are described under the microemulsion polymers A.

Regarding the measurement of the glass transition temperature and of the median particle size and the Q values, the statements made for the microemulsion polymers A are applicable for the graft copolymers A.

The graft copolymers A can also be prepared by grafting preformed polymers onto suitable graft homopolymers. Examples of these are the reaction products of maleic anhydride or copolymers containing acid groups with base-containing rubbers.

Suitable preparation processes for graft copolymers A are emulsion, solution, mass or suspension polymerization. The graft copolymers A are preferably prepared by free radical emulsion polymerization, in particular in the presence of latices of the component A1 at from 20 to 90° C. using water-soluble or oil-soluble initiators, such as peroxodisulfate or benzyl peroxide, or with the aid of redox initiators. Redox initiators are also suitable for polymerization below 20° C.

Suitable graft copolymers A include products which contain, as a core, a crosslinked diene rubber comprising one or more conjugated dienes, such as polybutadiene, or a copolymer of conjugated diene with an ethylenically unsaturated monomer, such as styrene and/or acrylate and/or acrylonitrile, and of one or more graft shells.

The graft copolymers A contain in general from 1 to 99, preferably from 10 to 90, particularly preferably from 30 to 75, % by weight of grafting base A1 and from 1 to 99, preferably from 10 to 90, particularly preferably from 25 to 70, % by weight of graft A2, the percentages being based in each case on the total molding material.

The component B of the novel molding material comprises semicrystalline polymers which are preferably selected from at least one polymer from semicrystalline polyamides, partly aromatic copolyamides, polyolefins, ionomers, polyesters, polyetherketones, polyoxyalkylenes and polyarylene sulfides.

Semicrystalline, preferably linear, polyamides, such as polyamide 6, polyamide 6,6, polyamide 4,6 and polyamide 6,12, and semicrystalline copolyamides based on these components are suitable as component B of the novel molding material. Semicrystalline polyamides whose acid component consists completely or partially of adipic acid and/or terephthalic acid and/or isophthalic acid and/or suberic acid and/or sebacic acid and/or azelaic acid and/or dodecanedicarboxylic acid and/or of a cyclohexanedicarboxylic acid and whose diamine component consists completely or partially of, in particular, m- and/or p-xylylenediamine and/or hexamethylenediamine and/or 2,2,4- and/or 2,4,4-trimethylhexame-thylenediamine and/or isophoronediamine and whose compositions are known in principle from the prior art (cf. Encyclopedia of Polymers, Vol. 11, page 315 et seq.) may also be used.

The number average molecular weights $M_n$ of the polyamides suitable as component B are preferably from 5,000 to 100,000, particularly preferably from 10,000 to 80,000.

Semicrystalline linear polyamides, for example having a relative viscosity of from 2.2 to 4.5, measured in 1% strength solution (1 g/100 ml) in 96% strength by weight sulfuric acid at 23° C., are suitable. Polyamides which are derived completely or partially from lactams having 7 to 13 ring members, such as polycaprolactam, polycapryllactam or polylaurolactam, and polyamides which are obtained by reacting dicarboxylic acids with one or more diamines are preferred. Suitable dicarboxylic acids are, for example, alkanedicarboxylic acids of 6 to 12, in particular 6 to 10, carbon atoms, in particular adipic acid.

Examples of diamines are alkanediamines of 4 to 12, in particular 4 to 8, carbon atoms, and m-xylylenediamine, bis-(4-aminophenyl)methane, bis-(4-aminocyclohexyl) methane or 2,2-bis-(4-aminophenyl)propane or mixtures thereof.

It may also be advantageous to use mixtures of the stated polyamides. Polyamide 6 (polycaprolactam), polyamide 6,6 (polyhexame-thyleneadipamide) and polyamides which are composed of at least 80% by weight of repeating units of the formula

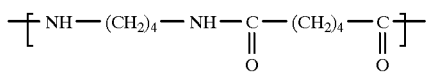

are of particular industrial importance.

Such polyamides are obtainable, for example, by condensation of 1,4-diaminobutane with adipic acid at elevated temperatures. Preparation processes for polyamides having this structure are described, for example, in EP-A-38 094, EP-A-38 582 and EP-A-39 524.

Polyamides containing a small amount, preferably up to about 10% by weight, of other cocomponents, preferably other amide formers, are also preferred. Polyamide 6 is most preferable.

In a further preferred embodiment of the invention, the novel molding materials contain, as component B, a partly aromatic copolyamide having the composition described below.

The partly aromatic copolyamides B contain, as component $b_1$), 40–90% by weight of units which are derived from terephthalic acid and hexamethylenediamine. A small amount of the terephthalic acid, preferably not more than 10% by weight of the total aromatic dicarboxylic acids used, may be replaced by isophthalic acid or other aromatic dicarboxylic acids, preferably those in which the carboxyl groups are in the para position.

In addition to the units which are derived from terephthalic acid and hexamethylenediamine, the partly aromatic copolyamides contain units which are derived from ε-caprolactam ($b_2$) and/or units which are derived from adipic acid and hexamethylenediamine ($b_3$).

The amount of units which are derived from ε-caprolactam is not more than 50, preferably 20–50, in particular 25–40, % by weight, while the amount of units which are derived from adipic acid and hexamethylenediamine is up to 60, preferably 30–60, in particular 35–55, % by weight.

The copolyamides may contain both units of ε-caprolactam and units of adipic acid and hexamethylenediamine; in this case, the amount of units which are free of aromatic groups is preferably at least 10, particularly preferably at least 20, % by weight. The ratio of the units which are derived from ε-caprolactam to those derived from adipic acid and hexamethylenediamine is not subject to any particular restriction.

Preferred copolyamides are those whose composition in the ternary diagram is within the pentagon described by apices $X_1$ to $X_5$, the points $X_1$ to $X_5$ being defined as follows:

$X_1$ 40% by weight of units $b_1$) 60% by weight of units $b_3$)

$X_2$ 60% by weight of units $b_1$) 40% by weight of units $b_3$)

$X_3$ 80% by weight of units $b_1$) 5% by weight of units $b_2$) 15% by weight of units $b_3$)

$X_4$ 80% by weight of units $b_1$) 20% by weight of units $b_2$)

$X_5$ 50% by weight of units $b_1$) 50% by weight of units $b_2$)

In EP 299 444, the pentagon described by these points is shown in a ternary diagram in a Figure.

Polyamides containing 50–80, in particular 60–75, % by weight of units which are derived from terephthalic acid and hexamethylenediamine (units $b_1$)) and 20–50, preferably 25–40, % by weight of units which are derived from ε-caprolactam (units $b_2$)) have proven particularly advantageous for many intended uses.

In addition to the units $b_1$) to $b_3$) described above, the novel partly aromatic copolyamides may also contain minor amounts, preferably not more than 15, in particular not more than 10, % by weight of further polyamide building blocks, as are known for other polyamides. These building blocks may be derived from dicarboxylic acids of 4–16 carbon atoms and aliphatic or cycloaliphatic diamines of 4–16 carbon atoms and from aminocarboxylic acids or corresponding lactams of 7–12 carbon atoms. Suitable monomers of these types are, for example, suberic acid, azelaic acid, sebacic acid or isophthalic acid as the dicarboxylic acid; 1,4-butanediamine, 1,5-pentanediamine, piperazine, 4,4'-diaminodicyclohexylmethane, 2,2-(4,4'-diaminodicyclohexyl)propane or 3,3'-dimethyl-4,4'-diaminodicyclohexylmethane as diamines; and capryllactam, enantholactam, omega-aminoundecanoic acid and laurolactam as lactams and aminocarboxylic acids, respectively.

The melting points of the partly aromatic copolyamides B) are from 260 to over 300° C., this high melting point also being associated with a high glass transition temperature of, as a rule, more than 75° C., in particular more than 85° C.

Binary copolyamides based on terephthalic acid, hexamethylenediamine and ε-caprolactam and containing about 70% by weight of units which are derived from terephthalic acid and hexamethylenediamine have melting points of about 300° C. and a glass transition temperature of more than 110° C.

Binary copolyamides based on terephthalic acid, adipic acid and hexamethylenediamine reach melting points of 300° C. or more even with lower contents of about 55% by weight of units obtained from terephthalic acid and hexamethylenediamine, the glass transition temperature not being quite as high as in the case of binary copolyamides which contain ε-caprolactam instead of adipic acid or adipic acid/HMD.

The preparation of the partly aromatic copolyamides B) can be carried out by the process described in EP-A 129 195 and EP-A 129 196.

In this process, an aqueous solution of the monomers, ie. in this case the monomers which form the units $b_1$) to $b_3$), is heated to 250–300° C. at superatmospheric pressure with simultaneous evaporation of water and formation of a prepolymer, prepolymers and vapors are then separated continuously, the vapors are rectified and the entrained diamines are recycled. Finally, the prepolymer is passed into a polycondensation zone and subjected to polycondensation at superatmospheric pressure of 1–10 bar and 250–300° C. In the process, it is important that the aqueous salt solution is heated at a superatmospheric pressure of 1–10 bar in the course of a residence time of less than 60 seconds, the conversion advantageously being at least 93% and the water content of the prepolymer not more than 7% by weight on emergence from the evaporator zone.

As a result of these short residence times, the formation of triamines is substantially prevented.

The aqueous solutions used have, as a rule, a monomer content of 30–70, in particular 40–65, % by weight.

A further process which resembles that described above is described in EP-A 129 196, to which reference is made here for further details of the process.

Examples of polymers which are furthermore suitable as component B of the novel molding materials are semicrystalline polyolefins, preferably homopolymers and copolymers of olefins, eg. ethylene, propylene, but-1-ene, pent-1-ene, hex-1-ene, hept-1-ene, 3-methylbut-1-ene, 4-methylbut-1-ene, 4-methylpent-1-ene and oct-1-ene. Suitable polyolefins are polyethylene, polypropylene, polybut-1-ene and poly-4-methylpent-1-ene. In the case of polyethylene (PE), a distinction is generally made between high density PE (HDPE), low density PE (LDPE) and linear low density PE (LLDPE).

Preferred polyolefins as component B of the novel molding materials are polyethylene, polypropylene and poly-4-methylpent-1-ene, polyethylene and polypropylene being particularly preferred. Polyolefins may also contain minor amounts of other monomers in addition to the olefins.

Another embodiment of the invention involves ionomers as component B. These are in general polyolefins as described above, in particular polyethylene, which contain cocondensed monomers having acid groups, for example acrylic acid and methacrylic acid and, if required, further copolymerizable monomers. The acid groups are generally converted with the aid of metal ions, for example $Na^+$, $Ca^{2+}$, $Mg^{2+}$ and $Al^{3+}$, into ionic, if desired ionically crosslinked, polyolefins, which however can still be processed by a thermoplastic method (cf. for example U.S. Pat. Nos. 3,264,272, 3,404,134, 3,355,319 and 4,321,337). However, it is not absolutely essential to convert the polyolefins containing acid groups by means of metal ions. Polyolefins which contain free acid groups and which then generally have a rubber-like character and in some cases also contain further polymerizable monomers, for example (meth)acrylates, are also suitable as novel component B.

Polyesters, preferably aromatic-aliphatic polyesters, may also be used as component B. Examples are polyalkylene terephthalates, for example those based on ethylene glycol, 1,3-propanediol, 1,4-butanediol, 1,6-hexanediol and 1,4-bishydroxymethylcyclohexane, and polyalkylene naphthalates. Polyethylene terephthalates, polybutylene terephthalates and copolymers of cyclohexane-1,4-dimethanol and ethylene glycol and terephthalic acid are preferably used. In particular, polybutylene terephthalate is used.

The weight average molecular weights Mw of the polyalkylene terephthalates are in general from 10,000 to 500,000, preferably from 10,000 to 80,000. The preparation, for example by transesterification, is described in the literature (cf. for example U.S. Pat. Nos. 2,647,885, 2,643,989, 2,534,028, 2,578,660, 2,742,494 and 2,901,466).

Furthermore, aromatic polyetherketones, as described, for example, in British Patent 1,078,234, U.S. Pat. No. 4,010,147 and European Patents 135,938, 292,211, 275,035, 270,998 and 165,406 and in the publication by C. K. Sham et al., Polymer 29/6 (1988), 1016–1020, may be used as component B. These polyetherketones can be obtained by reacting bisphenols with bis(haloaryl) ketones in polar aprotic solvents in the presence of alkaline metal carbonates, eg. lithium carbonate. The reaction of hydroquinone with 4,4'-difluorobenzophenone is an example.

Polyoxyalkylenes, eg. polyoxymethylene, may also be used as component B of the novel molding materials. The preparation of these compounds is known to a person skilled in the art, these polymers containing at least 50 mol % of repeating units —$CH_2O$— in the polymer main chain. The homopolymers are generally prepared by polymerization of formaldehyde or trioxane in the presence of suitable catalysts. For the purposes of the present invention, preferred components B are polyoxymethylene copolymers, in particular those which, in addition to the repeating units —$CH_2O$—, also contain up to 50, preferably from 0.1 to 20, in particular from 0.3 to 10, mol % of repeating units

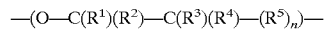

where $R^1$ to $R^4$ independently of one another are each hydrogen or $C_1$–$C_4$-alkyl of 1 to 4 carbon atoms, $R^5$ is —$CH_2$—, —$CH_2O$—, $C_1$–$C_4$-alkyl- or $C_1$–$C_4$-haloalkyl-substituted methylene or a corresponding oxymethylene group and n is 0–3. These groups can advantageously be introduced into the copolymers by ring cleavage of cyclic ethers. Preferred cyclic ethers are those of the formula

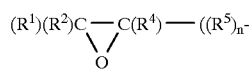

where $R^1$–$R^5$ and n have the abovementioned meanings. Merely by way of example, ethylene oxide, 1,2-propylene oxide, 1,2-butylene oxide, 1,3-butylene oxide, 1,3-dioxane, 1,3-dioxolane and 1,3-dioxepan may be mentioned as cyclic ethers and linear oligoformals or polyformals, such as polydioxolane or polydioxepan, may be mentioned as comonomers.

Oxymethylene terpolymers which are prepared, for example, by reacting trioxane and one of the cyclic ethers described above with a third monomer, preferably a bifunctional compound of the formula

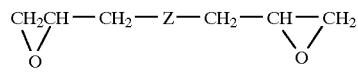

where Z is a chemical bond, —O— or —ORO— and R is $C_1$–$C_8$-alkylene or $C_3$–$C_8$-cycloalkylene, are also suitable as component B.

Preferred monomers of this type are ethylene diglycide, diglycidyl ether and diethers of glycidyl compounds and formaldehyde, dioxane or trioxane in a molar ratio of 2:1 and diethers of 2 mol of a glycidyl compound and 1 mol of an aliphatic diol of 2–8 carbon atoms, for example the diglycidyl ethers of ethylene glycol, 1,4-butanediol, cyclobutane-1,3-diol, 1,2-propanediol and cyclohexane-1,4-diol.

The preferred polyoxymethylene copolymers have melting points of at least 150° C. and weight average molecular weights Mw of 5,000–150,000, preferably 7,000–100,000. Polyoxymethylene polymers which are stabilized at the terminal groups and have C—C bonds at the chain ends are particularly preferred.

Other suitable components B are the polyarylene sulfides, in particular polyphenylene sulfide. The preparation is known and is described, for example, in U.S. Pat. Nos. 3,354,129, 3,786,035, 3,853,824, 3,856,560 and 3,862,095 and EP-A 171 021.

In a preferred embodiment, the novel molding materials contain, apart from the components A and B, additional components C and/or D and/or E and, if desired, further additives as defined below.

The novel molding materials can contain, as component C, up to 50, preferably from 5 to 30, % by weight of at least one of the polymers described below.

Suitable components C are all those microemulsion polymers and graft copolymers listed under component A which have rubber-like properties, ie. a glass transition temperature below 0° C., preferably below −20° C., particularly preferably below −30° C., with the proviso that the particle sizes of the graft copolymers are from 60 to 10,000 nm, in particular from 80 to 5,000, particularly preferably from 100 to 1,000 nm.

In a further preferred embodiment, component C is a thermoplastic polyurethane (TPU), thermoplastic elastomers or acrylate, diene, EP, EPDM or silicone rubber, each of which may, if desired, be grafted.

Furthermore, the novel molding material may contain, as component C, at least one graft copolymer C which is composed of C1: 30–90, preferably 40–80, % by weight of a grafting base C1 comprising an elastomeric polymer based on acrylate, diene, EP, EPDM or silicone rubber;

C2: 10–70, preferably 20–60, % by weight of a graft comprising

C21: 50–100, preferably 60–90, % by weight of styrene or substituted styrene (C21) and C22: up to 50, preferably 10–40, % by weight of acrylonitrile, methacrylonitrile, $C_1$–$C_8$-alkyl (meth) acrylate, (meth)acrylic acid, maleic anhydride, maleimide N-substituted by $C_1$–$C_8$-alkyl or by $C_6$–$C_{20}$-aryl, or mixtures thereof, having a median particle size of from 60 to 10,000 nm, preferably from 80 to 1,000 nm, the sum of A+C, based on the total molding material comprising A to C, being 1–99, preferably 10–90, % by weight and the weight ratio A:C being from 95:5 to 5:95, preferably from 90:10 to 10:90.

The statements made in the description of component A1 are applicable to the grafting base C1. Diene and acrylate rubbers, in particular the acrylate rubbers, are preferred here.

Preferred grafting bases C1 are those which are composed of

C11: 70–99.9, preferably 90–99, % by weight of at least one alkyl acrylate where the alkyl radical is of 1 to 8 carbon atoms, preferably n-butyl acrylate and/or 2-ethylhexyl acrylate, in particular n-butyl acrylate as the sole alkyl acrylate C12: 0–30, in particular 20–30, % by weight of a further copolymerizable monoethylenically unsaturated monomer, such as butadiene, isoprene, styrene, acrylonitrile, methyl methacrylate and/or vinyl methyl ether C13: 0.1–5, preferably 1–4, % by weight of a copolymerizable polyfunctional, preferably bifunctional or trifunctional, monomer which effects crosslinking.

Suitable bifunctional or polyfunctional crosslinking monomers C13 are monomers which preferably contain two, if desired also three or more, ethylenic double bonds capable of copolymerization. Examples of suitable crosslinking monomers are divinylbenzene, diallyl maleate, diallyl fumarate, diallyl phthalate, triallyl cyanurate and triallyl isocyanurate. Dicyclopentadienyl acrylate has proven to be a particularly advantageous crosslinking monomer (cf. DE-A 12 60 135).

This type of grafting bases is known per se and is described in the literature, for example in DE-A 31 49 358.

Preferred grafts C2 are those in which C21 is styrene or α-methylstyrene. In the case of component C22, methyl methacrylate and the maleimides N-substituted by $C_1$–$C_4$-alkyl or by $C_6$–$C_{20}$-aryl, in particular by phenyl, have proven particularly suitable, in addition to acrylonitrile and maleic anhydride. Particularly preferably used monomers are styrene and acrylonitrile, α-methylstyrene and acrylonitrile, styrene, acrylonitrile and methyl methacrylate, styrene and maleic anhydride. The grafts are obtainable by copolymerization of the components C21 and C22.

The graft copolymer C can be prepared, for example, by the method described in German Patent 1,260,135.

The graft (graft shell) of the graft copolymer may have a one-stage or multistage morphology.

In the case of a one-stage morphology of the graft shell, a mixture of the monomers C21 and C22 in the desired weight ratio of from 100:0 to 50:50, preferably from 90:10 to 60:40, is polymerized in the presence of an elastomer C1 in a manner known per se (cf. for example German Laid-Open Application DOS 2,826,925), preferably in emulsion.

In the case of a two-stage morphology of the graft shell C2, the 1st stage generally accounts for from 20 to 70, preferably from 25 to 50, % by weight, based on C2.

The 2nd stage of the graft shell preferably accounts for from 30 to 80, in particular from 50 to 75, % by weight, based in each case on C2. They are preferably prepared using mixtures of the stated monoethylenically unsaturated aromatic hydrocarbons C21 and monoethylenically unsaturated monomers C22 in a weight ratio C21/C22 of in general from 90:10 to 60:40, in particular from 80:20 to 70:30.

The conditions of the graft copolymerization are preferably chosen so that particle sizes of from 60 to 10,000 nm ($d_{50}$ value of the integral mass distribution) result. The relevant measures are known and are described, for example, in German Laid-Open Application DOS 2,826, 925. Particle sizes of from 80 to 1,000 nm are preferred.

A coarse-particled rubber emulsion can be prepared directly by the seed latex method.

In order to obtain tough products, a mixture of at least two graft copolymers having different particle sizes is preferably used.

For this purpose, the particles of the rubber are increased in size in a known manner, for example by agglomeration, so that the latex is bimodal (from 80 to 180 nm and from 200 to 1,000 nm).

In a preferred embodiment, a blend of two graft copolymers having particle diameters ($d_{50}$ value of the integral mass distribution) of from 80 to 180 nm and from 200 to 1,000 nm in a weight ratio of from 70:30 to 30:70 is used.

Blends of components B and C, the latter containing a coarse-particled and a finely divided graft copolymer, are described, for example, in German Laid-Open Application DOS 3,615,607. Other blends in which C has a two-stage graft shell are disclosed in EP-A 111 260.

The mixing components D of the novel molding materials comprise the polycarbonates. Suitable polycarbonates are, for example, those based on diphenols HO—Ar—A—Ar—OH, where —Ar— is arylene (phenylene, alkylphenylene or halogen-substituted arylene) and A is a single bond, $C_1$–$C_3$-alkylene, $C_2$- or $C_3$-alkenylidene, $C_3$–$C_6$-cycloalkenylidene, —S— or —$SO_2$—.

Preferred diphenols of the general formula I are hydroquinone, resorcinol, 4,4'-dihydroxybiphenyl, 2,2-bis (4-hydroxyphenyl)propane, 2,4-bis(4-hydroxyphenyl)-2-methylbutane and 1,1-bis(4-hydroxyphenyl)cyclohexane. 2,2-Bis(4-hydroxyphenyl)propane and 1,1-bis(4-hydroxyphenyl)cyclohexane are particularly preferred.

Polycarbonates are generally known and have been described in detail. They are present as component D in amounts of from 0 to 50, preferably from 10 to 40, % by weight, based in each case on the total molding material.

The novel preferred thermoplastic molding materials contain, as component E, from 0 to 50, preferably from 0 to 40, in particular from 0 to 30, % by weight of fibrous or particulate fillers or of a mixture thereof, based in each case on the total molding materials. These are preferably commercially available products. Reinforcing agents, such as carbon fibers and glass fibers, are usually used in amounts of from 5 to 50% by weight, based on the total molding material.

The glass fibers used may be of E, A or C glass and are preferably provided with a size and an adhesion promoter. Their diameter is in general from 6 to 20 µm. Both rovings and staple fibers having a length of from 1 to 10 µm, preferably from 3 to 6 µm, may be used.

Fillers or reinforcing materials, such as glass beads, mineral fibers, whiskers, alumina fibers, mica, quartz powder and wollastonite, may also be added.

Metal flakes (for example aluminum flakes from Transmet Corp.), metal powders, metal fibers, metal-coated fillers, for example nickel-coated glass fibers, and other additives which shield against electromagnetic waves, may also be mixed with the novel molding materials. Aluminum flakes (K 102 from Transmet) for EMI (electromagnetic interference) purposes are particularly suitable. The materials may also be mixed with additional carbon fibers, carbon black, in particular conductivity black, or nickel-coated C fibers.

The novel molding materials may also contain further additives which are typical and commonly used for polycarbonates, SAN polymers and graft copolymers or mixtures thereof. Examples of such additives are dyes, pigments, antistatic agents, antioxidants and in particular the lubricants which are advantageous for the preparation of moldings and shaped articles. Processing assistants and stabilizers, such as UV stabilizers, lubricants and antistatic agents, are usually used in amounts of from 0.01 to 5% by weight, based on the total molding material.

The novel thermoplastic molding materials are prepared by methods known per se, by mixing the components. It may be advantageous to premix individual components. It is also possible to mix the components in solution and remove the solvents.

Suitable organic solvents are, for example, chlorobenzene, mixtures of chlorobenzene and methylene chloride and mixtures of chlorobenzene and aromatic hydrocarbons, eg. toluene.

The solvent mixtures can be evaporated, for example, in devolatilization extruders.

The components, which for example are dry, can be mixed by all known methods. However, mixing is preferably carried out by extruding, kneading or roll-milling the components together, preferably at from 180 to 400° C., if necessary the components having been isolated beforehand from the solution obtained in the polymerization or from the aqueous emulsion.

The novel thermoplastic molding materials can be processed by the known methods for processing thermoplastics, for example by extrusion, injection molding, calendering, blow molding, pressing or sintering.

The novel thermoplastic molding materials have in particular high toughness, good resistance to chemicals and to weathering and good flow and rigidity.

The Examples which follow illustrate the invention.

EXAMPLES

I. Molding material comprising microemulsion polymer and polyamide
1. Preparation of the microemulsions
Microemulsion A 4814.4 g of distilled water, 800 g of an aqueous solution of the sodium salt of a $C_{12}$–$C_{18}$-paraffinsulfonic acid containing 40% of the salt and 9.6 g of potassium persulfate were heated to 65° C. under nitrogen while stirring.

A mixture of 2924.8 g of n-butyl acrylate (91.4%), 192.0 g of tert-butyl acrylate (6%), 19.2 g of methacrylic acid (0.6%) and 64 g of dihydrodicyclopentadienyl acrylate (2%) was added in the course of 3 hours and polymerization was then completed in the course of 2 hours at 70° C.

The median particle size was 40 nm.

Microemulsion A-V (Comparative Experiment)

Emulsion A-V was prepared in the same way as emulsion A, except that, instead of 800 g of the solution of the sodium salt of a $C_{12}$–$C_{18}$-paraffinsulfonic acid, only 96 g of the solution were used.

The median particle size was 55 nm.

Microemulsion B

Emulsion B was prepared in the same way as Emulsion A, except that, instead of 2924.8 g of n-butyl acrylate and 64 g of dihydrodicyclopentadienyl acrylate, 2892.4 g and 96 g respectively of these compounds were used.

The median particle size was 40 nm.

Microemulsion B-V (Comparative Experiment)

Emulsion B-V was prepared in the same way as Emulsion B, except that, instead of 800 g of the solution of the sodium salt of a $C_{12}$–$C_{18}$-paraffinsulfonic acid, only 96 g of the solution were used.

The median particle size was 55 nm.

2. Mixing

The mixtures were prepared in an extruder (type ZSK 53 from Werner und Pfleiderer). The thermoplastic was introduced at the feed of the extruder and plasticated in a first screw zone having a deep thread profile and was conveyed via a kneading zone into a second screw zone, in which the aqueous suspension of the elastomeric polymer was metered, the dispersion being conveyed by means of the upstream liquid pressure of a metering pump.

85% by weight of polyamide 6 (relative viscosity 3.3, measured in a 1% strength solution in concentrated sulfuric acid; Ultramid B35 from BASF) were thoroughly mixed with 15% by weight of the microemulsions A, A-V, B and B-V, mixing being carried out at a speed of 150 rpm and with a virtually constant temperature profile of about 250° C. between feed and discharge (preparation of the mixtures similar to EP 125 483 B1, page 7, lines 3–15).

After the preparation of the polymer blends, the latter were extruded again in a twin-screw extruder (ZSK 30 from Werner & Pfleiderer), under the following conditions:

(a) Temperature profile along the extruder: 120, 200, 260, 260, 260, 260, 260° C.
(b) Speed: 200 rpm
(c) Throughput: 10 kg/h The moldings were injection molded at a melt temperature of 280° C. and a molding temperature of 60° C.

The notched impact strength was determined according to DIN 53453 at 23° C. (unit: $kJ/m^2$).

The hole impact strength was determined according to DIN 53753-L-3,0, issue 4/81, at 23° C. (unit: $kJ/m^2$).

The total penetration energy $W_{total}$ (unit: Nm) was determined according to DIN 53443, Part 2, of January 1984, on 2 mm thick injection-molded circular disks having a diameter of 6 cm, using a die diameter of 20 mm and a cap radius of 10 mm, at a test speed of 4.5 m/s and a temperature of 23° C. The test apparatus used was a penetration apparatus from Zwick, with electronic recording of the measured values.

TABLE 1

| Micro-emulsion | Notched impact strength | Hole impact strength | Total penetration energy $W_{total}$ |
|---|---|---|---|
| A | 91 | 125 | 94 |
| A - V | 75 | 114 | 88 |
| B | 89 | 124 | n.m.[1] |
| B - V | 70 | 108 | n.m.[1] |

[1] n.m.: not measured

The novel molding materials prepared using the microemulsions A and B have a substantially higher notched impact strength and hole impact strength and a higher total penetration energy than the Comparative Experiments.

II. Molding material comprising rubber, polyoxymethylene copolymer and thermoplastic polyurethane 1. Preparation of the grafting base Water, different amounts of the sodium salt of a $C_{12}$–$C_{18}$-paraffinsulfonic acid (emulsion 1; trade name: Emulgator K30) and, if required, emulsion 2 (for formula see below; trade name: Triton X 100) and coemulsifier (hexanol) according to Table 2, 9.2 g of potassium peroxodisulfate, 9 g of sodium bicarbonate and 4.5 g of sodium pyrophosphate were heated to 65° C. while stirring. A mixture of 1960 g of n-butyl acrylate and 40 g of dicyclopentadienyl acrylate was added in the course of 3 hours, the subsequent reaction time being 2 hours. The results are shown in Table 2.

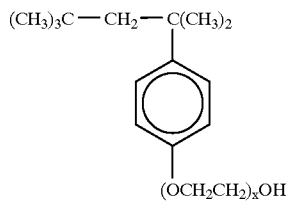

(OCH$_2$CH$_2$)$_x$OH

Triton X 100 (x about 10)

2. Grafting 4800 g of the above emulsion, water and 5 g of potassium peroxodisulfate were heated to 65° C. while stirring. 765 g of methyl methacrylate and 85 g of n-butyl acrylate were metered in over 2 hours, the subsequent reaction time being 2 hours. From the particle size and the particle size nonuniformity, it can be seen that the graft shell did not polymerize separately alongside the grafting base but onto said base (cf. Table 3).

3. Working up

After the emulsion had coagulated at low temperatures (3 days at –20° C.), it was thawed out and then filtered, washed, and dried at 60° C. under reduced pressure. The dried emulsion was mixed with the following polyoxymethylene copolymer as component B and with the following thermoplastic polyurethane as component C:

B. Polyoxymethylene copolymer (POM) obtained from 97.3% by weight of trioxane and 2.7% by weight of butanediol formal. The product also contained about 3% by weight of unconverted trioxane and 5% by weight of unstable components. After degradation of the thermally unstable components, the copolymer had a melt flow index of 9 g/10 min at 190° C. and 2.16 kg according to DIN 53735. The undegraded POM contained, as a stabilizer, 0.4% by weight of Irganox 245 from Ciba-Geigy, 0.2% by weight of melamine/formaldehyde condensate (prepared according to Example 1 of DE-25 40 207), 0.1% by weight of trisilicate and 0.1% by weight of a polyamide having blocked terminal groups, according to Example 5-4 of U.S. Pat. No. 3,960,984.

C: A thermoplastic polyurethane (Shore hardness 85 A), prepared by reacting diphenylmethane 4,4'-diisocyanate with polyesterpolyol (based on adipic acid and 1,6-hexanediol and 1,4-butanediol) and 1,4-butanediol as a chain extender.

The polymer blends were prepared in a ZSK30 twin-screw extruder from Werner & Pfleiderer, under the following conditions:

(a) Temperature profile along the extruder: 240, 240, 240, 190, 180° C.

(b) Speed: 120 rpm (c) Throughput: 6 kg/h

The total penetration energy $W_{total}$ was determined as in Example I.

The results are shown in Tables 2–4 below.

TABLE 2

Properties of the polymer microemulsions (A1)
Base stage: Composition 98% by weight of n-butyl acrylate (n-BA) + 2% by weight of dihydrodicyclopentadienyl acrylate (DCPA)

| No. | Emulsifier (% by weight, based on $A1_{solid}$) | Solids content (% by weight of solid in emulsion) Theoretical | Practice | pH | $d_{50}$ (nm) | Q* (as defined on page 7, line 5) |
|---|---|---|---|---|---|---|
| (i) | 10% Em. 1 | 25 | 24.8 | 8.6 | | 280.71 |
| (ii) | 5% Em. 1 5% Em. 2 | 25 | 24.9 | 8.5 | 29 | 0.69 |
| (iii) | 5% Em. 1 5% Hexanol | 25 | 24.0 | 8.6 | 41 | 0.68 |
| (iv) | 15% Em. 1 15% Em. 2 | 32.6 | 31.6 | 8.5 | | 250.60 |
| Comparison 1 | 15% Em. 1 15% Hexanol | 29.4 | 26.2 | 8.4 | | 880.85 |

*($d_{90}$–$d_{10}$): $d_{50}$

TABLE 3

Properties of the graft copolymer (A)
Grafting: 50% by weight of rubber (= 98 n-BA + 2 DCPA) + 50% by weight of graft shell comprising 90% by weight of methyl methacrylate + 10% by weight of n-BA)

| No. | Base stage | Solids content (% by weight of solid in emulsion) Theoretical | Practice | pH | $d_{50}$ (nm) | Q |
|---|---|---|---|---|---|---|
| (v) | (i) | 25.0 | 25.3 | 8.2 | 37 | 0.62 |
| (vi) | (ii) | 25.0 | 25.0 | 7.9 | 40 | 0.58 |
| (vii) | (iii) | 25.0 | 24.9 | 8.9 | 53 | 0.58 |
| (viii) | (iv) | 25.0 | 24.8 | 8.8 | 33 | 0.58 |
| Comparison 2 | Comparison 1 | 25.0 | 24.8 | 8.4 | 111 | 0.80 |

TABLE 4

Properties of the polymer blends

| No. | Rubber A (% by weight) | B (POM) (% by weight) | C (TPU) (% by weight) | Total penetration energy $W_{total}$ (Nm) |
|---|---|---|---|---|
| 1 | 20 (v) | 80 | — | 2.9 |
| 2 | 20 (vi) | 80 | — | 5.0 |
| 3 | 20 (vii) | 80 | — | 4.7 |
| Comparison 3 | 20 Comparison 2 | 80 | — | 1.9 |
| 4 | 3 (viii) | 77 | 20 | 44 |
| Comparison 4 | 3 Comparison 2 | 77 | 20 | 38 |

According to Table 4, the novel molding materials have a higher total penetration energy than the Comparative Experiments.

We claim:

1. A molding material providing the combination of impact resistance, rigidity, gloss and colorability, as well as transparency, consisting of, based on the sum of components A, B, C, D, and E:

A: 1–99% by weight of a particulate microemulsion graft copolymer A having a glass transition temperature below 0° C. and a median particle size of less than 50 nm, graft copolymer A consisting of:

A1: 1–99% by weight of a particulate grafting base A1 having a glass transition temperature below 0° C. and median particle size of less than 40 nm, said grafting base A1 being a member selected from the group consisting of natural rubber; epichlorohydrin rubbers; ethylene/vinyl acetate rubbers; chlorosulfonated polyethylene rubbers; polyether rubbers; diene rubbers; hydrogenated diene rubbers; polyalkenamer rubbers; acrylate rubbers that are prepared from $C_4$–$C_8$-alkyl acrylates which are selected from the group consisting of butyl acrylate, hexyl acrylate, octyl acrylate and 2-ethylhexyl acrylate, and contain as polymerized units from 0 up to 30% by weight of a monomer which forms a hard polymer and is selected from the group consisting of vinyl acetate, (meth)acrylonitrile, styrene, substituted styrene, methyl methacrylate and vinyl ether, and up to 10% by weight of a crosslinking, polyfunctional monomer selected from the group consisting of divinylbenzene, diallyl maleate, diallyl phosphate, allyl methacrylate and dicyclopentadienyl acrylate; ethylene propylene rubbers; ethylene/propylene/diene rubbers; butyl rubbers; and fluorine rubbers; and A2: 1–99% by weight of a graft A2 consisting of the following monomers, based on A2:

A21: 40–100% by weight of a (meth)acrylate or of a mixture thereof, and

A22: up to 60% by weight of acrylonitrile or methacrylonitrile, wherein the graft A2 consists of at least one graft shell, and an outermost graft shell thereof has a glass transition temperature of more than 0° C., and wherein a polymer formed from one or more of the monomers of the graft A2 would have a glass transition temperature of more than 0° C.;

B: 1–99% by weight of a polyoxyalkylene as polymer B;

C: 0–50% by weight of a polymer selected from a particulate graft copolymer having a median particle size of from 60 to 10,000 nm, consisting of:

C1: 30–90% by weight of a grafting base C1 consisting of:

C11: 70–99.9% by weight of at least one alkyl acrylate having an alkyl radical of 1 to 8 carbon atoms, C12: 0–30% by weight of a further copolymerizable monoethylenically unsaturated monomer selected from the group consisting of butadiene, isoprene, styrene, acrylonitrile, methyl methacrylate and vinyl methyl ether, C13: 0.1–5% by weight of a copolymerizable polyfunctional monomer which effects crosslinking;

C2: 10–70% by weight of a graft consisting of:

C21: 50–100% by weight of styrene or substituted styrene and

C22: up to 50% by weight of a member selected from the group consisting of acrylonitrile, methacrylonitrile, $C_1$–$C_8$-alkyl (meth)acrylate, (meth)acrylic acid, maleic anhydride, and maleimide N-substituted by $C_1$–$C_8$-alkyl or by $C_6$–$C_{20}$-acryl;

or a thermoplastic elastomer;

D: 0–50% by weight of a polycarbonate; and

E: 0–50% by weight of a fibrous or particulate filler or of a mixture thereof.

2. A molding material as defined in claim 1, which contains, as particulate microemulsion graft copolymer A, an acrylate, diene, EP or EPDM rubber.

3. A molding material as defined in claim 1, wherein the polymer C is a thermoplastic polyurethane.

4. The molding material of claim 1, wherein polymer B is polyoxymethylene.

5. The molding material of claim 4, wherein the polymer of component C is a thermoplastic polyurethane.

* * * * *

UNITED STATES PATENT AND TRADEMARK OFFICE
CERTIFICATE OF CORRECTION

PATENT NO. : 5,977,254
DATED : November 2,1999
INVENTOR(S) : McKee et al.

It is certified that error appears in the above-identified patent and that said Letters Patent is hereby corrected as shown below:

Title page, Foreign application priority data should read:
Item [30],

-- March 3,1994 [DE] Federal Republic of Germany....... 44 07 069 --

Signed and Sealed this

Sixteenth Day of May, 2000

Attest:

Q. TODD DICKINSON

*Attesting Officer*    *Director of Patents and Trademarks*